(12) United States Patent
Kaibel et al.

(10) Patent No.: US 7,169,267 B2
(45) Date of Patent: Jan. 30, 2007

(54) METHOD AND DEVICE FOR CARRYING OUT THE DISTILLATIVE SEPARATION OF $C_{5+}$ CUTS

(75) Inventors: Gerd Kaibel, Lampertheim (DE); Carsten Oost, Bad Dürkheim (DE); Manfred Stroezel, Ilvesheim (DE); Gerald Meyer, Ludwigshafen (DE); Peter Trübenbach, Birkenheide (DE); Karl-Heinz Sartor, Neuried (DE); Jürgen Heners, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 360 days.

(21) Appl. No.: 10/380,551

(22) PCT Filed: Sep. 19, 2001

(86) PCT No.: PCT/EP01/10837

§ 371 (c)(1),
(2), (4) Date: Mar. 17, 2003

(87) PCT Pub. No.: WO02/24300

PCT Pub. Date: Mar. 28, 2002

(65) Prior Publication Data
US 2004/0011706 A1 Jan. 22, 2004

(30) Foreign Application Priority Data
Sep. 20, 2000 (DE) ................. 100 46 609

(51) Int. Cl.
*B01D 3/14* (2006.01)
*B01D 3/42* (2006.01)

(52) U.S. Cl. ............ 203/1; 203/2; 203/3; 203/78; 203/80; 203/98; 203/99; 203/DIG. 19; 208/347; 208/350; 585/800

(58) Field of Classification Search ............. 203/1, 203/2, 3, 78, 80, 98, 99, 100, DIG. 19; 208/347, 208/350; 585/800
See application file for complete search history.

(56) References Cited

U.S. PATENT DOCUMENTS

| | | | |
|---|---|---|---|
| 4,994,152 A * | 2/1991 | Kaibel et al. | 203/75 |
| 5,035,732 A * | 7/1991 | McCue, Jr. | 62/627 |
| 5,675,054 A * | 10/1997 | Manley et al. | 585/809 |
| 5,897,748 A * | 4/1999 | Kaibel | 203/1 |
| 6,250,106 B1 * | 6/2001 | Agrawal | 62/643 |
| 6,762,334 B1 * | 7/2004 | Stewart et al. | 585/323 |

FOREIGN PATENT DOCUMENTS

| | | |
|---|---|---|
| EP | 640367 | 6/1995 |
| EP | 780147 | 6/1997 |

OTHER PUBLICATIONS

DGMK-Conf.:"Selective Hydrogenations and Dehydrogenations", Nov. 11-12, 1993, p. 1-30.
Franck et al., "Ind. Arom.", 1987, p. 126-127.
Chem. Eng., Jul. 2000, p. 27-30.

* cited by examiner

Primary Examiner—Virginia Manoharan
(74) Attorney, Agent, or Firm—Novak Druce & Quigg, LLP

(57) ABSTRACT

A process is proposed for the separation of $C_{5+}$ cuts by distillation into a low-boiler (A), a medium-boiler (B) and a high-boiler fraction (C) in one or more dividing-wall columns (TK), in which a dividing wall (T) is arranged in the longitudinal direction of the column with formation of an upper, common column region (1), a lower, common column region (6), a feed part (2, 4) with rectifying section (2) and stripping section (4), and a withdrawal part (3, 5) with rectifying section (5) and stripping section (3), with feed of the $C_{5+}$ cut (A, B, C) into the central region of the feed part (2, 4), discharge of the high-boiler fraction (C) from the bottom of the column, discharge of the low-boiler fraction (A) via the top of the column, and discharge of the medium-boiler fraction (B) from the central region of the withdrawal part (3, 5), wherein the dividing ratio of the liquid reflux at the upper end of the dividing wall (T) is set in such a way that the proportion of high-boiling key components in the liquid reflux over the stripping section (3) of the withdrawal part at the upper end of the dividing wall (T) is from 10 to 80%, preferably from 30 to 50%, of the limit value allowed in the medium-boiler fraction (B), and wherein the heating power in the evaporator at the bottom of the dividing-wall column (TK) is set in such a way that the concentration of the low-boiling key components in the liquid at the lower end of the dividing wall (T) is from 10 to 80%, preferably from 30 to 50%, of the limit value allowed in the medium-boiler fraction (B).

20 Claims, 12 Drawing Sheets

METHOD AND DEVICE FOR CARRYING OUT THE DISTILLATIVE SEPARATION OF $C_{5+}$ CUTS

Figure 1:
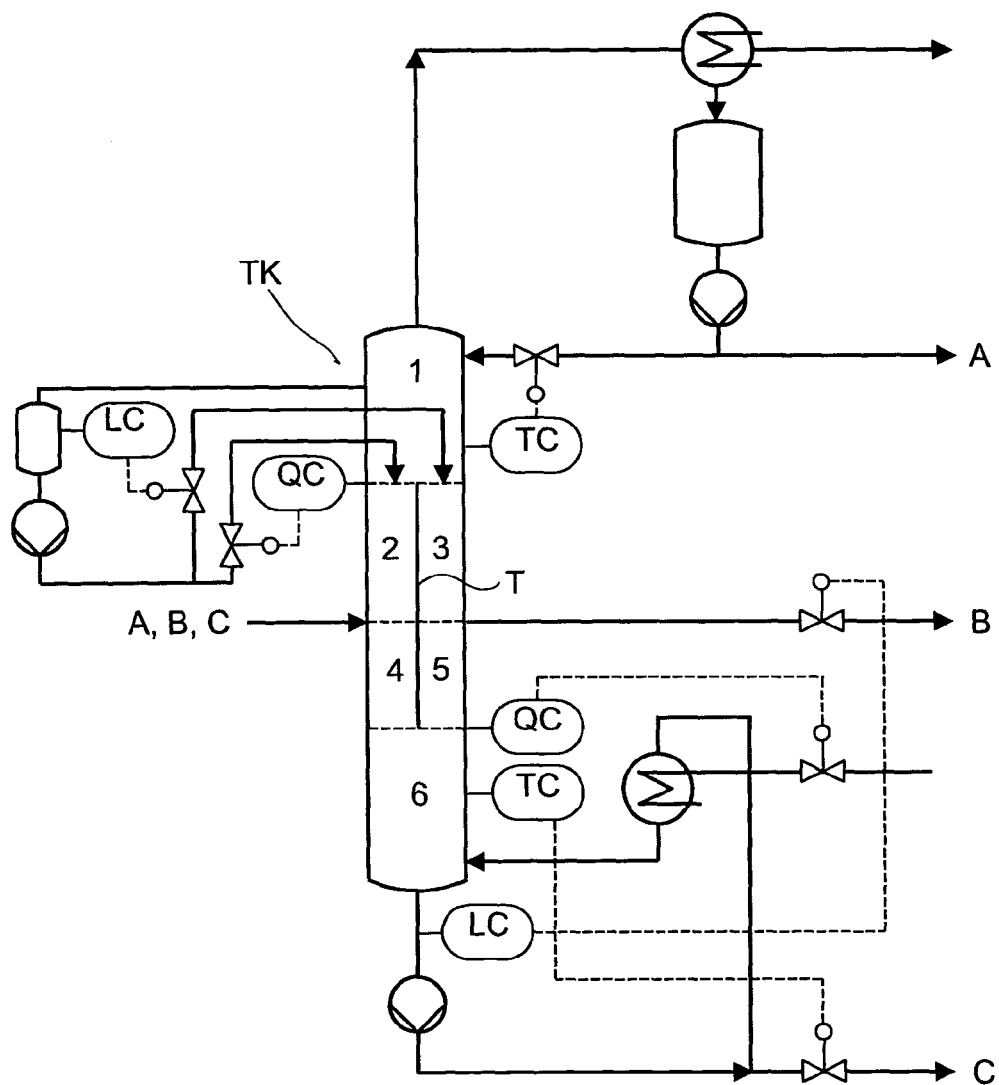
Figure 2:
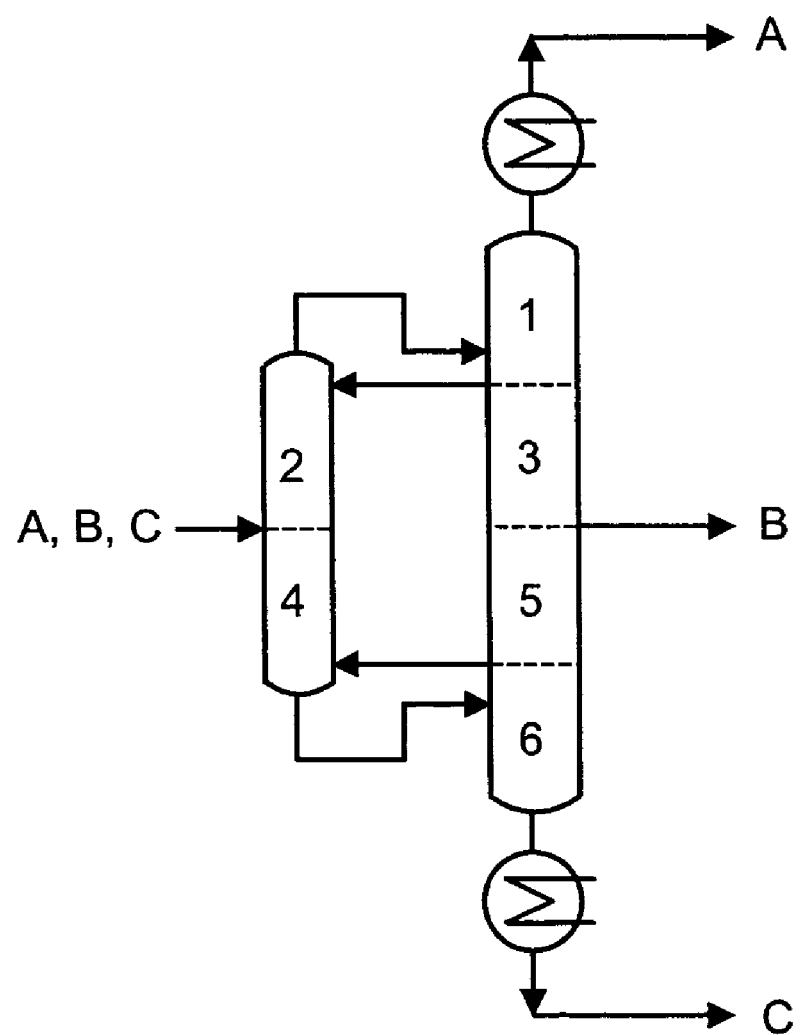
Figure 3:
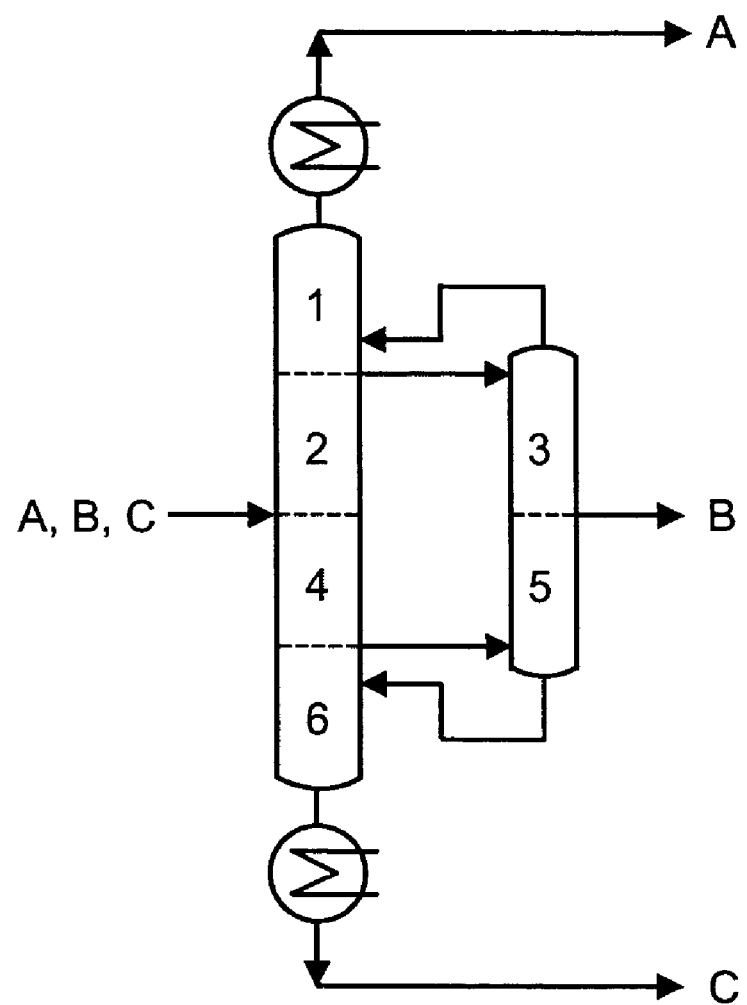

This application is a 371 of PCT/EP01/10837 filed on Sep. 19, 2001.

The invention relates to a process for the separation of $C_{5+}$ cuts by distillation, and to an apparatus for carrying out the process.

In refineries and petrochemical plants (steam crackers, FCC crackers and reformers), hydrocarbon streams are produced, stored and processed to a large extent. In order to ensure specific use in the downstream value creation chain, the hydrocarbon streams are usually separated into various fractions by distillation. An important fraction in terms of volume here is the $C_{5+}$ cut. This typically comprises unsaturated compounds, whose presence, as is known, results in problems, in particular during processing and/or storage. In most cases, selective and/or full hydrogenation of the aliphatic hydrocarbons is therefore carried out. The unsaturated hydrocarbons are usually hydrogenated in the liquid phase on Pd- or Ni-containing catalysts. In the selective hydrogenation of the $C_{5+}$ cut, the polyunsaturated compounds, for example dienes and acetylenes, are preferably hydrogenated to give monoenes, and styrene is preferably hydrogenated to give ethylbenzene.

The hydrogenated $C_{5+}$ cut is in most cases subsequently used to obtain aromatic compounds. The further processing is usually carried out by suitable combinations of distillation, hydrogenation and/or extractive distillation for the recovery of aromatic compounds.

A process of this type was presented, for example, at the DGMK conference "Selective Hydrogenation and Dehydrogenation" in Kassel on Nov. 11 to 12, 1993, and is described in DGMK Conference Report 9305, pages 1 to 30, with the following process chain: selective hydrogenation of the $C_5$ cut from the cracker, separation into a $C_5$ cut, a $C_{6-8}$ cut and a $C_{9+}$ cut by distillation, full hydrogenation of the $C_{6-8}$ cut, and extractive distillation in order to recover aromatic compounds.

The separation of a $C_{5+}$ cut, which is also known as crude benzene, by distillation is described in H.-G. Franck and J. W. Stadelhofer: "Industrielle Aromatenchemie" [Industrial Aromatics Chemistry], Springer-Verlag Berlin, 1987, pages 126 ff., according to which the $C_{5+}$ cut is separated into a $C_5$ fraction and a $C_{6+}$ fraction in a first column. Separation of the $C_{6+}$ into the $C_{6-8}$ fraction and a $C_{9+}$ fraction is then carried out in a second column.

The $C_{5+}$ cut is a complex mixture of a multiplicity of components having frequently small differences in the relative volatilities. In all known distillative processes for its separation, a plurality of columns is always necessary in order to obtain pure products. In addition, the composition of the $C_5$ cut is subject to variations, in particular owing to the different composition of the feed stream fed to the cracker or reformer and to the differences in the desired product spectrum, which necessitate different operating conditions of the cracker or reformer.

For the separation of multicomponent mixtures by distillation, so-called divided-wall columns are known, i.e. distillation columns with vertical divided-walls which prevent cross-mixing of liquid and vapor streams in part-regions. The dividing wall, which consists of a flat metal sheet, divides the column in the longitudinal direction in its central region into a feed part and a withdrawal part.

A similar result can be achieved using so-called thermally coupled columns, i.e. arrangements of at least two columns, where each of the columns has at least two links to each of the other columns at spatially separate points.

It is basically known from Chemical Engineering, July 2000, pages 27 to 30, to use dividing-wall columns for the separation of benzene from mixtures containing same. However, this reference does not indicate the particular process conditions under which these separation tasks, which are known to be difficult, can be achieved.

It is an object of the present invention to provide a process for the separation of $C_{5+}$ cuts by distillation in one or more dividing-wall columns in which a pure, specification-compliant product can be withdrawn as medium-boiler fraction.

We have found that this object is achieved by a process for the separation of $C_{5+}$ cuts by distillation into a low-boiler (A), a medium-boiler (B) and a high-boiler fraction (C) in one or more dividing-wall columns, in which a dividing wall is arranged in the longitudinal direction of the column with formation of an upper, common column region, a lower, common column region, a feed part with rectifying section and stripping section, and a withdrawal part with rectifying section and stripping section, with feed of the $C_{5+}$ cut into the central region of the feed part, discharge of the high-boiler fraction from the bottom of the column, discharge of the low-boiler fraction via the top of the column, and discharge of the medium-boiler fraction from the central region of the withdrawal part, wherein the dividing ratio of the liquid reflux at the upper end of the dividing wall is set in such a way that the proportion of high-boiling key components in the liquid reflux over the stripping section of the withdrawal part at the upper end of the dividing wall is from 10 to 80%, preferably from 30 to 50%, of the limit value allowed in the medium-boiler fraction, and wherein the heating power in the evaporator at the bottom of the dividing-wall column is set in such a way that the concentration of the low-boiling key components in the liquid at the lower end of the dividing wall is from 10 to 80%, preferably from 30 to 50%, of the limit value allowed in the medium-boiler fraction.

The $C_{5+}$ cut to be employed here as starting mixture denotes, in a known manner, a mixture of hydrocarbons having five or more carbon atoms per molecule. It comprises predominantly n-pentane, i-pentane, methylbutenes, cyclopentane, benzene, toluene, ethylbenzene and xylenes. This can be, for example hydrogenated $C_{5+}$ cuts, such as hydrogenated pyrolysis gasoline, but the process according to the invention is not restricted thereto, but instead can be employed generally for the separation of $C_{5+}$ cuts by distillation.

Surprisingly, it has been found that the way the process is carried out in accordance with the invention facilitates optimum-energy performance of the distillative separation while retaining good values for the specification of the middle-boiling fraction, even for varying feed compositions of the $C_5$ cut. In particular, the known calculation formula based on the relative volatilities which can be used for three-component mixtures cannot be used in the present case since the feed compositions can shift greatly and the choice of a specific component or representative component summaries is problematic.

Dividing-wall columns typically have a dividing wall aligned in the longitudinal direction of the column which divides the column interior into the following sub-regions: an upper, common column region, a lower, common column region and a feed part and a withdrawal part, each with rectifying section and stripping section. The mixture to be separated, here the $C_{5+}$ cut, is introduced into the central region of the feed part, a high-boiler fraction is withdrawn from the bottom of the column, a low-boiler fraction is withdrawn via the top of the column, and a medium-boiler fraction is withdrawn from the central region of the withdrawal part.

In the separation of multicomponent mixtures into a low-boiler fraction, a medium-boiler fraction and a high-boiler fraction, the maximum permissible content of low boilers and high boilers in the medium-boiler fraction is usually specified. Components which are critical for the separation problem, so-called key components, are specified here. This can be an individual key component or the sum of a plurality of key components. In the present process, key components for the medium-boiler fraction are, for example, so long as a benzene/toluene/xylene is taken off as such, cyclopentane, cyclopentene, hexane and hexene (low-boiling key components) and nonane (high-boiling key components).

Surprisingly, it has been found that compliance with the specification regarding the key components by carrying out the process in accordance with the invention can be ensured by regulating the dividing ratio of the liquid at the upper end of the dividing wall and the heating power of the evaporator in a certain manner. The dividing ratio of the liquid at the upper end of the dividing wall is set in such a way that the content of high-boiling key components in a liquid reflux over the stripping section of the withdrawal part is from 10 to 80%, preferably from 30 to 50%, of the limit value permitted in the medium-boiler fraction, and that the heating power in the evaporator at the bottom of the dividing-wall column is set in such a way that the concentration of the low-boiling key components in the liquid at the lower end of the dividing wall is from 10 to 80%, preferably from 30 to 50%, of the limit value permitted in the medium-boiler fraction. Correspondingly, the liquid division at the upper end of the dividing wall is set in the case of this regulation in such a way that at relatively high contents of high-boiling key components, more liquid is fed to the feed part, and in the case of relatively low contents thereof, less liquid is fed to the feed part. Analogously, the regulation of the heating power is carried out in such a way that in the case of a relatively high content of low-boiling key components, the heating power is increased, and in the case of a relatively low content thereof, the heating power is reduced.

It has been found that a further improvement in the process can be achieved by ensuring that a substantially uniform admission of liquid is ensured through corresponding control specifications. Deviations in the feed amount or feed concentration are compensated for. In the present case, the upper region of the feed part is particularly sensitive, since only very small amounts of liquid occur here in an optimized procedure. The claimed regulation of a lower limit for the liquid load in this column part is a simple and effective measure for preventing failure of the column due to de-linking of the separation internals. To this end, it is ensured in accordance with the invention that the liquid division at the upper end of the dividing wall is regulated in such a way that the liquid load in the rectifying section of the feed part does not drop below 30% of its normal value.

The division of the liquid flowing out of the rectifying section of the withdrawal part of the dividing-wall column into the discharged medium-boiler fraction and the rectifying section of the withdrawal part of the dividing-wall column is preferably also regulated in such a way that the amount of liquid introduced into the rectifying section does not drop below 30% of its normal value. As stated above regarding the upper region of the feed part, only very low liquid loads occur in this column part too for an optimized procedure. The preferred process measure prevents failure of the column in a simple and effective manner.

Collecting chambers for the liquid which are arranged both inside and outside the column and which take on the function of a pump stock tank or ensure a sufficiently high static liquid level an enable liquid to be passed on regulated by control elements, for example valves, are suitable for the division and withdrawal of the liquids at the upper end of the dividing wall or at the side take-off point in the central region of the withdrawal part. In the case of tray columns, it is particularly favorable to do this by enlarging the outflow shaft to about 2 to 3 times the usual height and storing the corresponding amount of liquid in it. On use of packed columns, the liquid is firstly collected in collectors, from where it is passed into an internal or external collecting chamber.

The middle-boiler fraction is preferably withdrawn in liquid form; this process variant is thermally advantageous and can be achieved with simpler equipment.

In a preferred process variant, the vapor stream at the lower end of the dividing wall is set in such a way that the amount ratio of the vapor stream in the feed part to the vapor stream in the withdrawal part is from 0.8 to 1.2, preferably from 0.9 to 1.1, and the return from the upper, common column part is regulated in such a way that the ratio between the return stream in the feed part and the return in the withdrawal part is from 0.1 to 2, preferably from 0.3 to 0.6, preferably through the choice and/or dimensioning of separation-active internals and/or through the installation of devices which generate a pressure loss.

The withdrawal of the top stream can furthermore preferably take place with temperature control, with the measurement point for the control temperature being arranged in the upper, common part-region of the column, at a point which is arranged from 3 to 8, preferably from 4 to 6, theoretical separation stages below the upper end of the column.

Corresponding to a further preferred process variant, the withdrawal of the high-boiler stream can take place with temperature control, with the measurement point for the control temperature being arranged in the lower, common column region from 3 to 8, preferably from 4 to 6, theoretical stages above the lower end of the column.

The adequate choice of the measurement points for the control temperatures is not trivial owing to the different feed compositions.

According to a further process variant, the withdrawal of the medium-boiler fraction takes place under level control, with the control variable being the liquid level in the evaporator or in the bottom of the column. The bottom level is usually regulated via the bottom take-off. However, a conventional regulation of this type results in unsatisfactory control behavior in the present process. The preferred control concept claimed with regulation of the bottom level via the side take-off significantly improves the stability.

An operating pressure in the range from 0.5 to 5 bar, in particular from 1 to 2 bar, is preferred.

The invention also relates to a dividing-wall column for carrying out the process according to the invention. Dividing-wall columns having from 20 to 60, preferably having from 25 to 45, theoretical separation stages are particularly suitable for this purpose.

The division of the number of separation stages into the individual part-regions of the dividing-wall column is preferably carried out in such a way that each of the 6 column regions of the dividing-wall column has from 5 to 50%, preferably from 15 to 30%, of the total number of theoretical separation stages of the dividing-wall column.

The division of the theoretical separation stages into the column sub-regions can preferably be carried out in such a way that the number of theoretical separation stages in the feed part is from 80 to 110%, preferably from 90 to 100%, of the total number of theoretical separation stages in the withdrawal part.

In a preferred embodiment of the dividing-wall column, the feed point of the stream to be separated and the withdrawal point of the medium-boiler fraction can be arranged at different heights in the column, preferably separated by from 1 to 20, in particular from 3 to 8, theoretical separation stages.

There are in principle no restrictions regarding the separation-active internals which can be employed in the dividing-wall column: both packing elements and ordered packing or trays are suitable for this purpose. For cost reasons, trays, preferably valve or perforated trays, are generally employed in columns having a diameter of greater than 1.2 m. In the case of packed columns, ordered sheet-metal packing having a specific surface area of from 100 to 500 $m^2/m^3$ preferably from about 250 to 300 $m^2/m^3$, is particularly suitable.

In the case of particularly high demands regarding product purity, it is favorable, in particular for the case where packing is employed as separation-active internals, to equip the dividing wall with thermal insulation. A dividing-wall design of this type is described, for example, in EP-A-0 640 367. A double-walled design with a narrow gas space in between is particularly favorable.

In accordance with the invention, it is also possible to employ thermally coupled columns instead of the dividing-wall column. Arrangements with thermally coupled columns are equivalent to a dividing-wall column in terms of the energy demand. This variant of the invention is particularly appropriate as an economically advantageous alternative if existing columns are available. The most suitable forms of interconnection can be selected depending on the number of separation stages of the available columns.

The thermally coupled columns can thus each be fitted with its own evaporator and/or condenser.

In a preferred connection of the thermally coupled column, the low-boiler fraction and the high-boiler fraction are withdrawn from different columns, with the operating pressure of the column from which the high-boiler fraction is withdrawn being set lower than the operating pressure of the column from which the low-boiler fraction is withdrawn, preferably by from 0.1 to 2 bar.

According to a particular connection form, it is possible for the bottom stream from the first column to be partially or fully evaporated in an evaporator and subsequently fed to the second column in two phases or in the form of a gaseous stream and a liquid stream.

The process according to the invention can preferably be carried out, both on use of a dividing-wall column and on use of thermally coupled columns, in such a way that the feed stream is partially or fully pre-evaporated and fed to the column in two phases or in the form of a gaseous stream and a liquid stream.

This pre-evaporation is particularly appropriate if the bottom stream from the first column comprises relatively large amounts of medium-boilers. In this case, the pre-evaporation can be carried out at a lower temperature level and the load on the evaporator in the second column reduced. Furthermore, this measure significantly reduces the load on the stripping section in the second column. The pre-evaporated stream can be fed to the second column in two phases or in the form of two separate streams.

The dividing-wall column for carrying out the process according to the invention preferably has sampling facilities at the upper and lower ends of the dividing wall, via which liquid and/or gaseous samples can be withdrawn from the column continuously or at time intervals and analyzed with respect to their composition, preferably by gas chromatography. Feed compositions which are outside the technical design calculations may occur in the process according to the invention for the separation of $C_5$ cuts by distillation. In this case, the arrangement of sampling supports at the upper and lower ends of the dividing wall, which is otherwise not usual in dividing-wall columns, and analysis of samples offer effective assistance for determining suitable operating conditions.

In this embodiment with thermally coupled columns, the sampling facilities are arranged analogously in the connecting lines between the regions of the thermally coupled columns which correspond to the sub-regions of the dividing-wall column.

In a preferred embodiment, trays whose pressure loss increases constantly with increasing gas loading, preferably by at least 10% per increase in the F factor by 0.5 $Pa^{0.5}$, are employed in the dividing-wall column or in the thermally coupled columns. The F factor here (dimension: pascals) denotes in a known manner the gas loading in the form of the product of the gas velocity in the dimension m/s and the square root of the gas density in the direction $kg/m^3$. The technical instruction preferably to employ only internals whose pressure loss increases constantly with the gas load in dividing-wall columns with trays is new. It ensures increased operational reliability of the column. In the case of certain bubble-cap trays, it has been found, for example, that gas in some cases no longer flowed through either the feed part or the withdrawal part of the column during start-up of the column or on a further increase in the gas load, which meant that operation as intended was no longer ensured.

The invention is explained in greater detail below with reference to a drawing and with reference to working examples.

In the figures, identical reference numerals denote identical or corresponding features.

Figure 9:
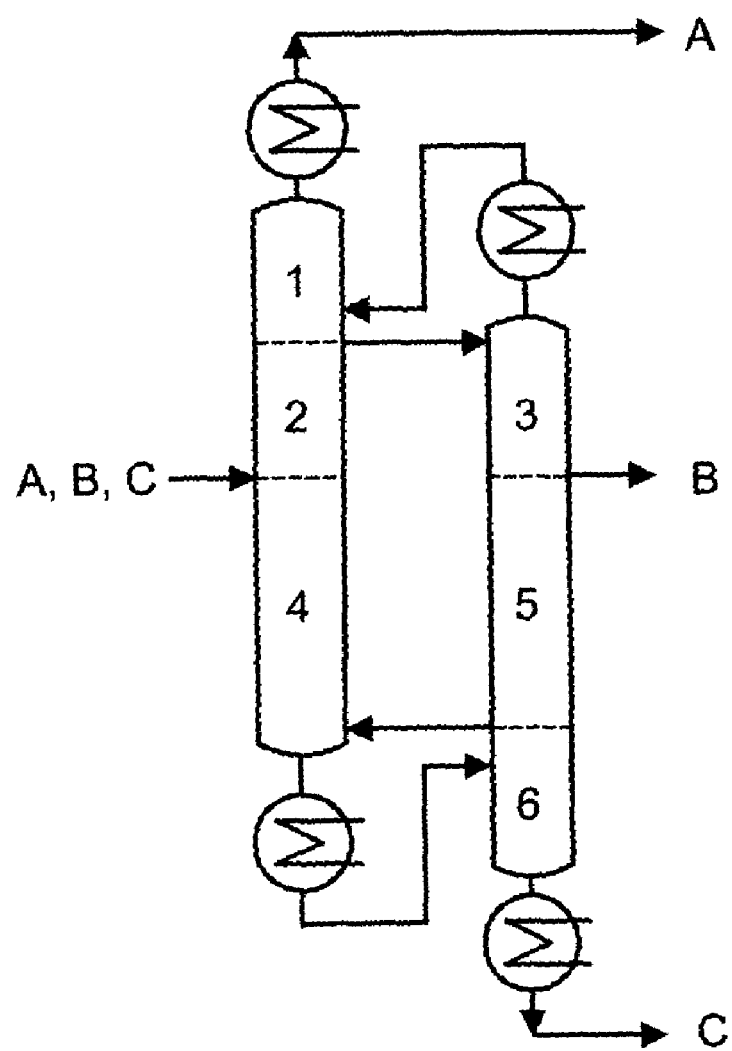
Figure 10:
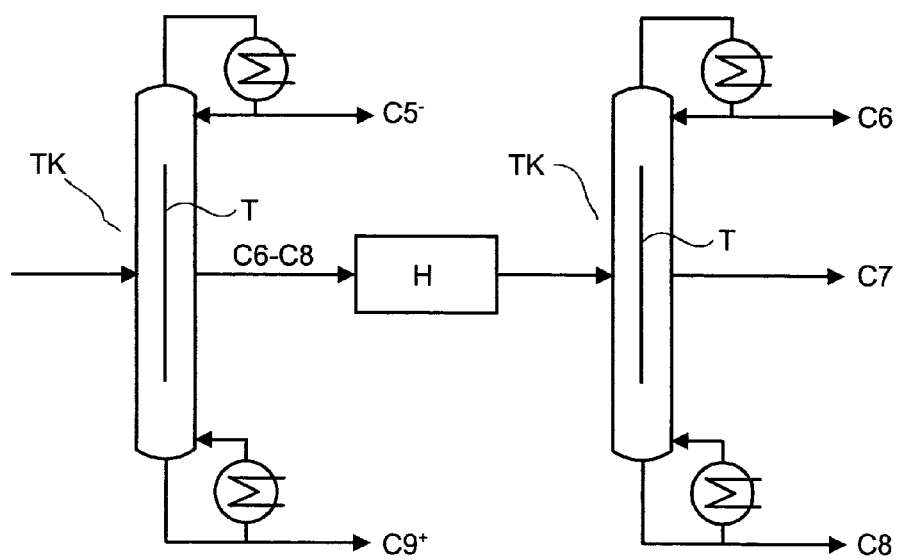
Figure 11:
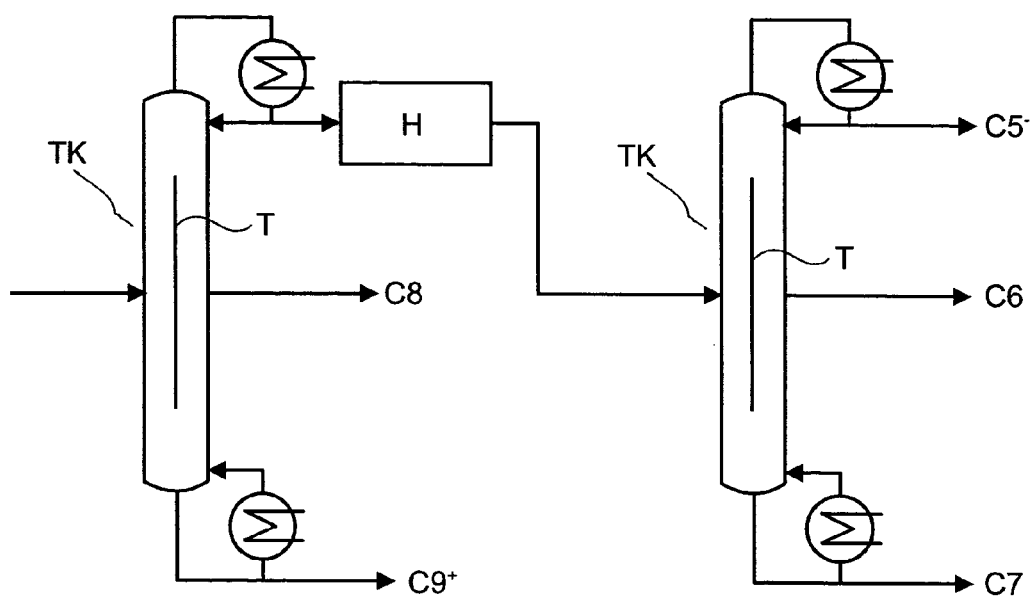
Figure 12:
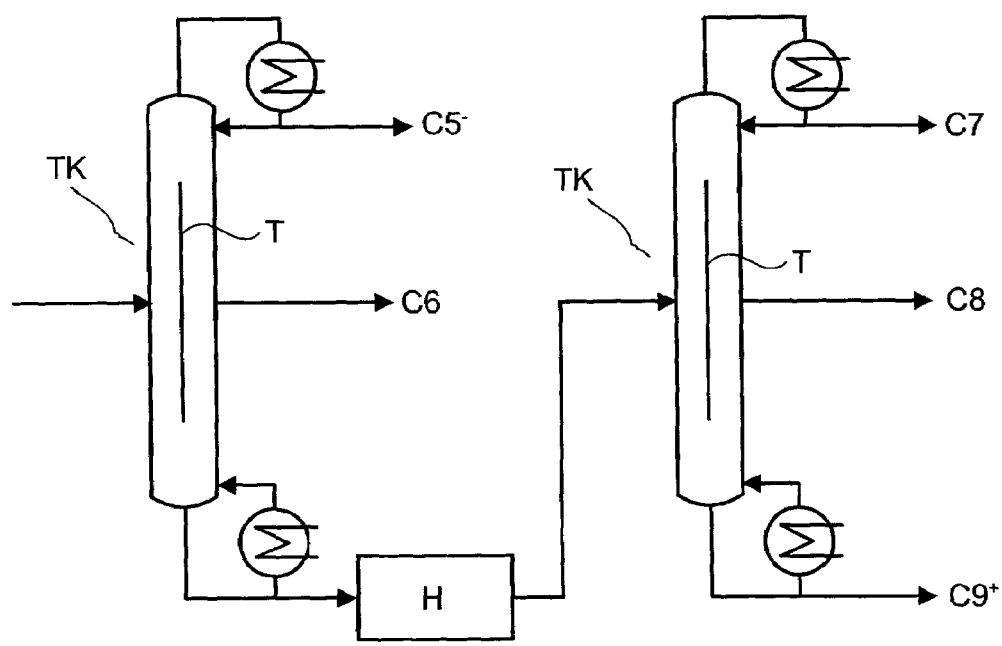

In detail, FIG. 1 shows a diagrammatic representation of a dividing-wall column for carrying out the process according to the invention, FIGS. 2–9 show different connection schemes of thermally coupled columns, and FIGS. 10–12 show connection schemes of in each case two dividing-wall columns for the separation of $C_{5+}$ cuts by distillation.

FIG. 1 shows diagrammatically a dividing-wall column (TK) with dividing wall (T) arranged vertically therein, dividing the column into an upper, common column region 1, a lower, common column region 6, a feed part 2, 4 with rectifying section 2 and stripping section 4, and a withdrawal part 3, 5 with stripping section 3 and rectifying section 5. The mixture to be separated (A, B, C) is fed into the central region of the feed part 2, 4. The low-boiler fraction (A) is discharged at the top of the column, the high-boiler fraction (C) is discharged from the bottom of the column, and the medium-boiler fraction (B) is discharged from the central region of the withdrawal part 3, 5. In accordance with the invention, the division of the liquid reflux (QC) is regulated at the upper and lower ends of the column. Preferably, as shown in FIG. 1, the withdrawal of the top stream (A) and the withdrawal of the high-boiler stream (C) can take place under temperature control (TC). The medium-boiler fraction (B) is preferably withdrawn under level control, the control quantity used being the liquid level (LC) in the evaporator or at the bottom of the column.

Figure 4:
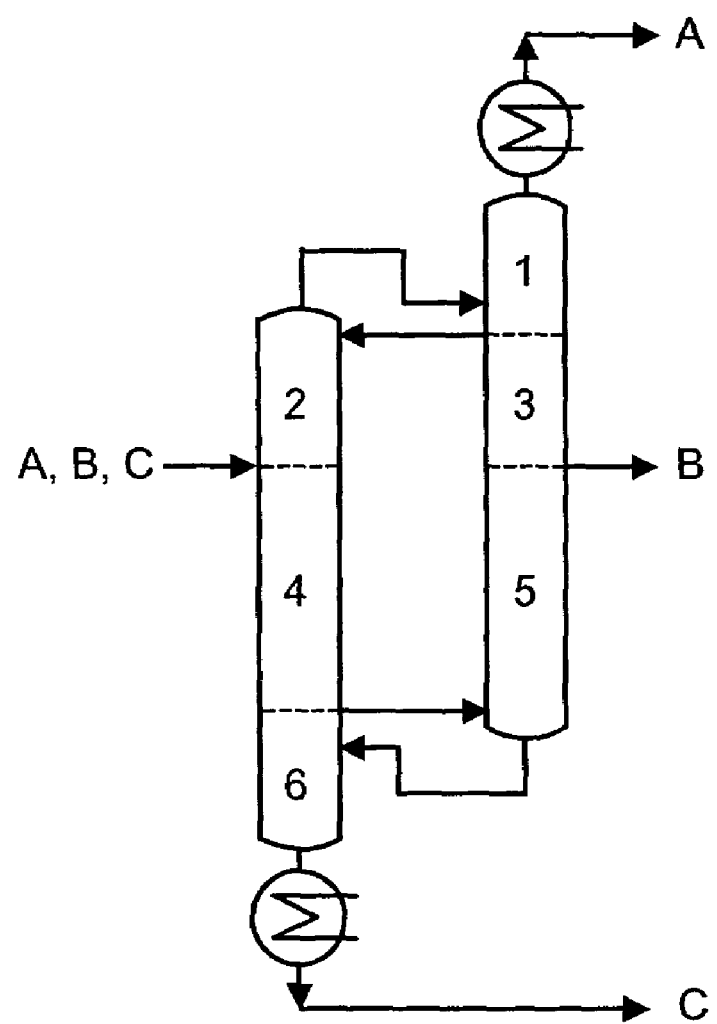
Figure 5:
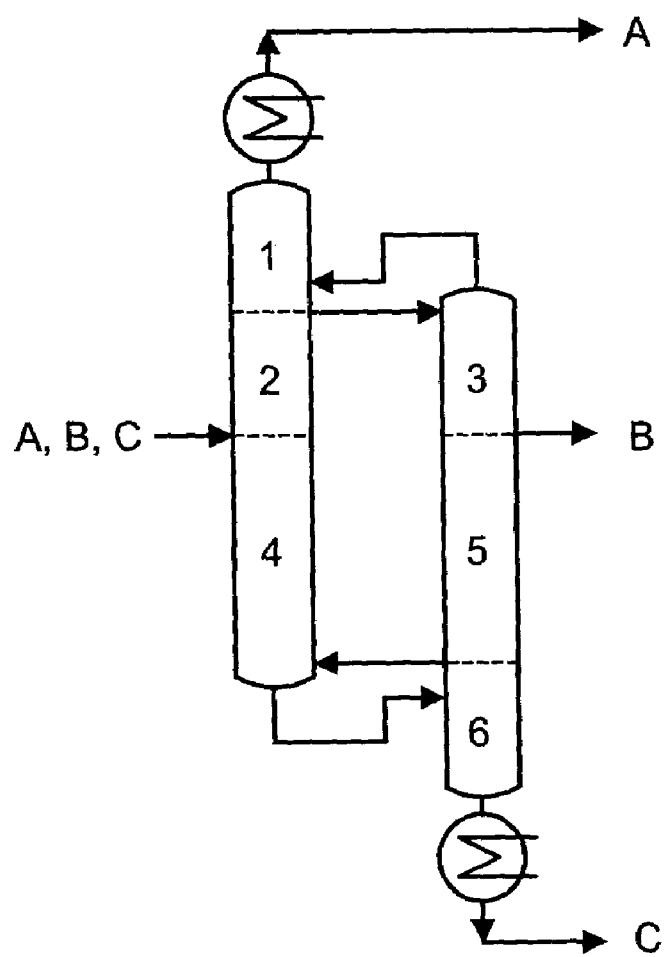
Figure 6:
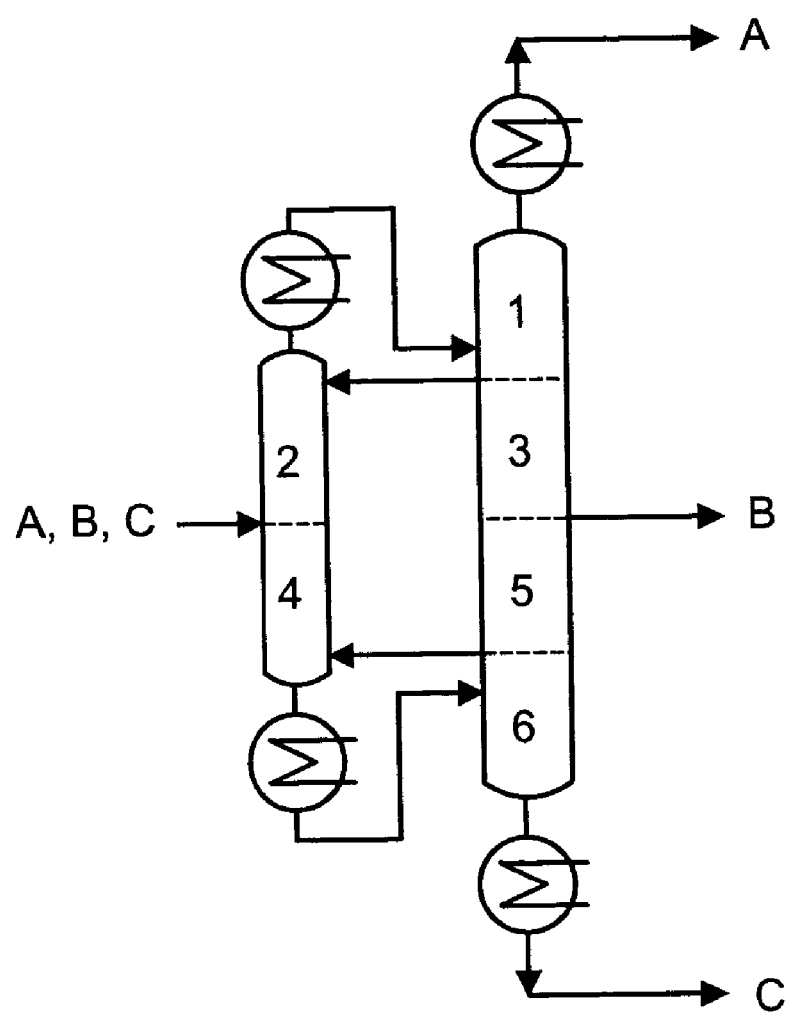
Figure 7:
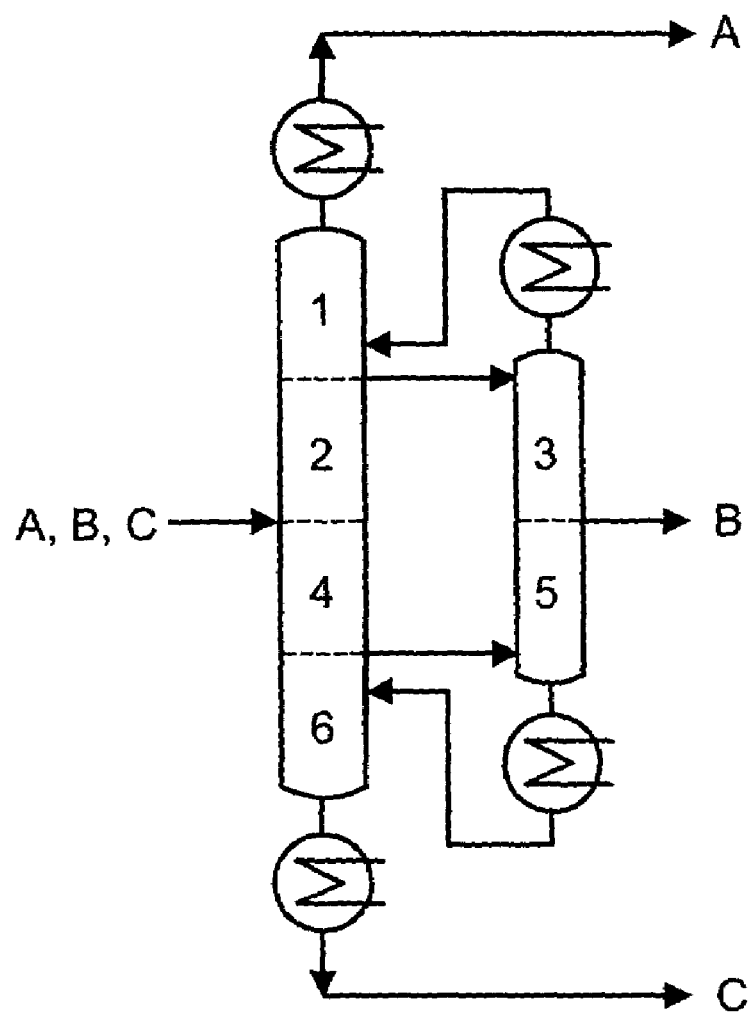
Figure 8:
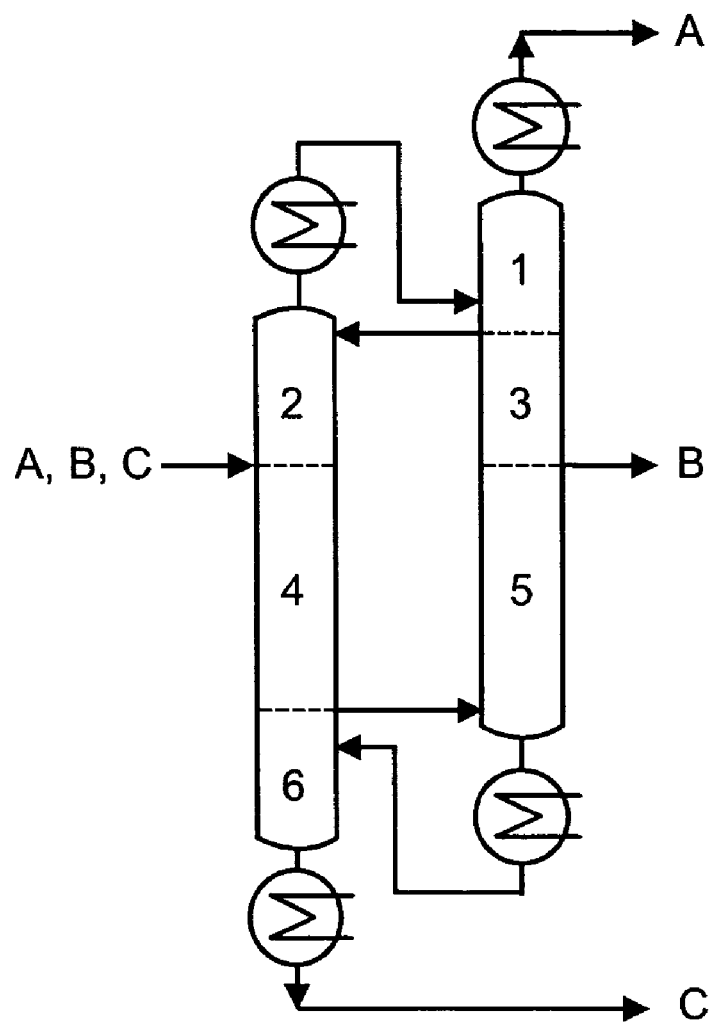

In the apparatus variants with thermally coupled columns shown in FIGS. 2 to 5, the sub-regions 1 to 6 of the dividing-wall column are taken over by in each case different regions of the thermally coupled columns. Corresponding regions are denoted by the same reference numerals in each case. Particularly preferred embodiments in which the high-boiler stream (C) and the low-boiler stream (A) are taken off from different columns, are shown in FIGS. 4 and 5. The two columns here are preferably operated at different operating pressures, with the operating pressure of the column from which the high-boiler fraction (C) is withdrawn being lower than the operating pressure of the column from which the low-boiler fraction (A) is withdrawn, preferably from 0.1 to 2 bar lower. FIGS. 6 to 9 show preferred embodiments with thermally coupled columns, each with its own evaporator at the bottom and its own condenser.

FIGS. 10 to 12 show particular connection schemes of dividing-wall columns for the separation of $C_{5+}$ cuts by distillation. Each of the dividing-wall columns (TK) shown is preferably operated in accordance with the process according to the invention. FIG. 10 shows as an example of the separation of pyrolysis gasoline into a $C_{5-}$ fraction, a $C_{9+}$ fraction and a $C_6$–$C_8$ fraction. The $C_6$–$C_8$ fraction can, if appropriate after hydrogenation H, be separated into a $C_6$ fraction, a $C_7$ fraction and a $C_8$ fraction in a further dividing-wall column. It is likewise possible firstly to separate off the $C_{9+}$ fraction at the bottom of a dividing-wall column, to obtain the $C_8$ fraction via the side take-off, and to separate the top product into the $C_{5-}$ fraction, $C_6$ fraction and $C_7$ fraction in a further dividing-wall column, if appropriate after hydrogenation H (FIG. 11). It is furthermore possible firstly to obtain the $C_{5-}$ fraction as the top product in a dividing-wall column and to withdraw the $C_6$ fraction via the side take-off. In this case, the bottom product, where appropriate after hydrogenation H, can be separated into the $C_7$ fraction, $C_8$ fraction and $C_{9+}$ fraction in a downstream dividing-wall column (FIG. 12).

EXAMPLE

A $C_{5+}$ cut from the hydrogenation of pyrolysis gasoline having the composition indicated below was separated by distillation:

| Component | % by weight |
| --- | --- |
| n-butane | 0.33 |
| 2-butene trans | 0.56 |
| n-pentane | 6.83 |
| 2-methyl-2-butene | 3.64 |
| 2-pentene trans | 2.29 |
| cyclopentane | 4.18 |
| cyclopentene | 0.56 |
| n-hexane | 2.92 |
| methylcyclopentane | 1.57 |
| methylcyclopentene | 2.54 |
| cyclohexane | 0.99 |
| benzene | 31.71 |
| n-heptane | 0.90 |
| methylcyclohexane | 1.43 |
| toluene | 15.16 |
| n-octane | 1.81 |
| ethylbenzene | 5.45 |
| m-xylene | 5.53 |

-continued

| Component | % by weight |
| --- | --- |
| 1-methyl-3-ethylbenzene | 4.35 |
| indane | 1.67 |
| dicyclopentadiene | 1.07 |
| methylindene | 0.76 |
| naphthalene | 2.59 |
| | 100.0 |

This $C_{5+}$ cut was separated into a $C_5$ cut (low-boiler fraction), a benzene/toluene/xylene cut, abbreviated below to BTX cut (medium-boiler fraction), and a $C_{9+}$ cut (high-boiler fraction). The specification required for the separation was that the $C_5$ cut had a benzene content of 0.05% by weight and the $C_{9+}$ cut had a xylene content of 1.8% by weight. In addition, the specification for the BTX cut required a $C_5$ content (low-boiling key components) of <5% by weight, a $C_{9+}$ content (high-boiling key components) of <1.5% by weight and a yield of at least 77.8%.

The separation was carried out in a dividing-wall column as shown in FIG. 1.

Alternatively, the dividing-wall column was replaced by a connection scheme of two thermally coupled columns, as shown in FIG. 9.

In both alternatives, the heating power in the evaporator at the bottom of the dividing-wall column or of the first of the thermally coupled columns was set in such a way that the sum of the concentrations of cyclopentane and pentane (low-boiling key components) in the liquid at the lower end of the dividing wall or in the lower exchange stream between the thermally coupled columns was less than 1.5% by weight. At the same time, the dividing ratio of the liquid reflux at the upper end of the dividing wall or in the upper exchange stream between the thermally coupled columns was set in such a way that the sum of the concentrations of indane and cyclopentadiene in the liquid reflux to the rectifying section of the feed part or the corresponding column part in the alternative with thermally coupled columns was less than 0.5% by weight.

It was possible to comply with the above-mentioned specification with this regulation scheme, but not when the process was carried out without the above-described regulation scheme.

We claim:

1. A process for the separation of C5+ cuts by distillation into a low-boiler, a medium-boiler and a high-boiler fraction in at least one dividing-wall column, in which a dividing wall is arranged in the longitudinal direction of the column with formation at an upper, common column region, a lower, common column region, a feed part with rectifying section and stripping section, and a withdrawal part with rectifying section and stripping section, with feed of the C5+ cut into the central region of the feed part, discharge of the high-boiler fraction from the bottom of the column, discharge of the low-boiler fraction via the tap of the column, and discharge of the medium-boiler fraction from the central region of the withdrawal part, wherein the dividing ratio of the liquid reflux at the upper end of the dividing wall is set in such a way that the proportion of high-boiling key components in the liquid reflux over the stripping section of the withdrawal part at the upper end of the dividing wall is from 10 to 80% of a limit value allowed in the medium-boiler fraction, and wherein a heating power in an evaporator at the bottom of the at least one dividing-wall column is set in such a way that the concentration of the low-boiling key components in the liquid at the lower end of the dividing wall is from 10 to 80% of the limit value allowed in the medium-boiler fraction.

2. A process as claimed in claim 1, wherein the liquid division at the upper end of the dividing wall is regulated in such a way that the liquid load in the rectifying section of the feed part does not drop below 30% of its normal value.

3. A process as claimed in claim 1, wherein the division of the liquid flowing out of the rectifying section of the withdrawal part of the at least one dividing-wall column into the withdrawn medium-boiler fraction and the rectifying section of the withdrawal part of the at least one dividing-wall column is set by regulation in such a way that the amount of liquid introduced into the rectifying section does not drop below 30% of its normal value.

4. A process as claimed in claim 1, wherein the medium-boiler fraction discharge is withdrawn in liquid form.

5. A process as claimed in claim 4, wherein the withdrawal of the medium-boiler fraction takes place under level control, and the control quantity used is the liquid level in the evaporator or at the bottom of the column.

6. A process as claimed in claim 1, wherein a vapor stream at the lower end of the dividing wall is set in such a way that the ratio of a vapor stream in the feed part to a vapor stream in the withdrawal part is from 0.8 to 1.2 and in that the liquid reflux from the upper common column part is regulated in such a way that the ratio of the liquid reflux in the feed part to the liquid reflux in the withdrawal part is from 0.1 to 1.0.

7. A process as claimed in claim 6, wherein the amount ratio of the vapor stream in the feed part to the vapor stream in the withdrawal part is determined through dimensioning of separation-active internals and/or an installation of devices which produce a pressure loss.

8. A process as claimed in claim 6, wherein the ratio of the liquid reflux in the feed part to the liquid reflux in the withdrawal part is determined through dimensioning of separation-active internals and/or an installation of devices which produce a pressure loss.

9. A process as claimed in claim 1, wherein the withdrawal of the low boiler fraction takes place under temperature control, with the measurement point for the control temperature being arranged in the upper, common part-region of the column, at a point which is arranged from 3 to 8 theoretical separation stages below the upper end of the column.

10. A process as claimed in claim 1, wherein the withdrawal of the high-boiler stream takes place under temperature control, with the measurement point for the control temperature being arranged in the lower, common column region, from 3 to 8 theoretical separation stages above the lower end of the column.

11. A process as claimed in claim 1, wherein the at least one dividing-wall column has from 20 to 60 theoretical separation stages.

12. A process as claimed in claim 11, wherein column regions 1 to 6 each have from 5 to 50% of the total number of theoretical separation stages of the at least one dividing-wall column.

13. A process as claimed in claim 11, wherein the feed point for a mixture to be separated and the withdrawal point for the medium-boiler section are arranged at different heights in the column separated by from 1 to 20 theoretical separation stages.

14. A process as claimed in claim 1, wherein the feed stream is partially or fully pre-evaporated and fed to the column in two phases or in the form of a gaseous stream and a liquid stream.

15. A process as claimed in claim 1, wherein sampling facilities are provided at the upper and lower ends of the dividing wall, via which liquid and/or gaseous samples can be withdrawn from the column continuously or at time intervals and analyzed with respect to their composition.

16. A process as claimed in claim 1, wherein trays whose pressure loss increases constantly with increasing gas load, by at least 10% per increase in the F factor by 0.5 $Pa^{0.5}$, are employed in the at least one dividing-wall column.

17. A process for the separation of C5+ cuts by distillation into a low-boiler, a medium-boiler and a high-boiler fraction in at least one thermally coupled column, where the low-boiler fraction and the high-boiler fraction are withdrawn from different columns, and the operating pressure of the column from which the high-boiler fraction is withdrawn is set from 0.1 to 2 bar lower than the operating pressure of the column from which the low-boiler fraction is withdrawn, with the at least one column arranged to have different regions wherein there is formation of an upper, common column region, a lower, common column region, a feed part with rectifying section and stripping section, and a withdrawal part with rectifying section and stripping section, with feed of the C5+ cut into the central region of the feed part, discharge of the high-boiler fraction from the bottom of the column, discharge of the low-boiler fraction via the top of the column, and discharge of the medium-boiler fraction from the central region of the withdrawal part, wherein the different regions may be in different columns, and wherein the dividing ratio of the liquid reflux at the upper end of the at least one thermally coupled column is set in such a way that the proportion of high-boiling key components in the liquid reflux over the stripping section of the withdrawal part at the upper end of the at least one thermally coupled column is from 10 to 80% of a limit value allowed in the medium boiler fraction, and wherein a heating power in an evaporator at the bottom of the at least one thermally coupled column is set in such a way that the concentration of the low-boiling key components in the liquid at the lower end of the at least one thermally coupled column is from 10 to 80% of the limit value allowed in the medium-boiler fraction.

18. A process as claimed in claim 17 where a bottom stream from a first column is partially or fully evaporated in an evaporator and subsequently fed to a second column in two phases or in the form of a gaseous stream and a liquid stream.

19. A process as claimed in claim 17, wherein the thermally coupled columns are each fitted with their own evaporator and/or condenser.

20. A process as claimed in claim 17, wherein trays whose pressure loss increases constantly with increasing gas load, by at least 10% per increase in the F factor by 0.5 $Pa^{0.5}$, are employed in the at least one thermally coupled column.

* * * * *

UNITED STATES PATENT AND TRADEMARK OFFICE
CERTIFICATE OF CORRECTION

PATENT NO. : 7,169,267 B2
APPLICATION NO. : 10/380551
DATED : January 30, 2007
INVENTOR(S) : Kaibel et al.

It is certified that error appears in the above-identified patent and that said Letters Patent is hereby corrected as shown below:

Column 8, indicated line 58, "the tap" should read --the top--

Signed and Sealed this

Tenth Day of July, 2007

JON W. DUDAS
*Director of the United States Patent and Trademark Office*